US008477845B2

(12) United States Patent
Liu et al.

(10) Patent No.: US 8,477,845 B2
(45) Date of Patent: Jul. 2, 2013

(54) PREDICTIVE ADAPTIVE SCAN ORDERING FOR VIDEO CODING

(75) Inventors: Lingzhi Liu, San Jose, CA (US); Xiang Li, Mountain View, CA (US); Jianhua Zheng, Beijing (CN); Nam Ling, San Jose, CA (US); Cheng-Xiong Zhang, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 399 days.

(21) Appl. No.: 12/905,872

(22) Filed: Oct. 15, 2010

(65) Prior Publication Data

US 2011/0090955 A1 Apr. 21, 2011

Related U.S. Application Data

(60) Provisional application No. 61/252,443, filed on Oct. 16, 2009.

(51) Int. Cl.
*H04N 7/12* (2006.01)

(52) U.S. Cl.
USPC ............ 375/240.03; 375/240.01; 375/240.02; 375/240.12

(58) Field of Classification Search
USPC ............................ 375/240.01–240.03, 240.12
See application file for complete search history.

(56) References Cited

U.S. PATENT DOCUMENTS

2008/0310512 A1* 12/2008 Ye et al. .................. 375/240.16
2010/0329341 A1 12/2010 Kam et al.
2011/0090961 A1 4/2011 Fong et al.

FOREIGN PATENT DOCUMENTS
EP 1768415 A1 3/2007

OTHER PUBLICATIONS

Li, Xiang et. al., "Predictive Adaptive Transform Coefficients Scan Ordering for Inter-Frame Coding," Joint Collaborative Team on Video Coding (JCT-VC) of ITU-T SG16 WP3 and ISO/IEC JTC1/SC29/WG11, JCTVC-A020 (r1), Apr. 15-23, 2010, 4 pages.
Yoo, Young-Joe, et al., "Adaptive Scan Pattern for Quantized Coefficients in Intra Coding of H.264," IEICE Trans. Inf. & Syst., vol. E92-D, Apr. 2009, pp. 750-752.
Choi, Byeong-Doo, et al., "Adaptive Coefficient Scanning Based on the Intra Prediction Mode," ETRI Journal, vol. 29, Oct. 2007, pp. 694-696.
Cabeen, Ken, et al., "Image Compression and the Discrete Cosine Transform," College of the Redwoods, 11 pages.

(Continued)

*Primary Examiner* — Sath V Perungavoor
*Assistant Examiner* — Geepy Pe
(74) *Attorney, Agent, or Firm* — Conley Rose, P.C.; Grant Rodolph; Clint Wilkins

(57) ABSTRACT

An apparatus comprising an inter-prediction motion compensation unit, a transform unit coupled to the inter-prediction motion compensation unit, a quantization unit coupled to the transform unit such that the transform unit is positioned between the inter-prediction motion compensation unit and the quantization unit, a scanning unit coupled to the quantization unit such that the quantization unit is positioned between the transform unit and the scanning unit, and an adaptive scan order predictor unit coupled to the inter-prediction motion compensation unit, the quantization unit, and the scanning unit. An apparatus comprising an entropy decoding unit, an inverse scanning unit coupled to the entropy decoding unit, an inverse quantization unit coupled to the inverse scanning unit such that the inverse scanning unit is positioned between the entropy coding unit and the inverse quantization unit, and an adaptive scan order predictor unit coupled to the entropy decoding unit and the inverse scanning unit.

17 Claims, 6 Drawing Sheets

OTHER PUBLICATIONS

Kim, Dae-Yeon, et al., "Adaptive Scanning Using Pixel Similarity for H.264/AVC," IEICE Trans. Fundamentals, vol. E90-A, May 2007, pp. I112-I115.

Sühring, K., "Joint Video Tem Reference Software JM15.1," http://iphome.hhi.de/suehring/tml, Last accessed Aug. 11, 2011.

Bjontegaard, Gisle, "Calcuation of Average PSNR Differences Between RD-Curves," ITU-T Q.61SG16 VCEG, VCEG-M33, Apr. 2-4, 2001, 4 pages.

Lam, E., et. al., "A Mathematical Analysis of the DCT Coefficient Distributions for Images," IEEE Transactions on Image Processing, Oct. 2000, 5 pages.

Wiegand, T., et. al., "Overview of the H.264/AVC Video Coding Standard," IEEE Transactions on Circuits and Systems for Video Technology, Jul. 2003, 16 pages.

Xiang, Li, et al., "Predictive Adaptive Transform Coefficients Scan Ordering for Inter-Frame Coding," JCTVC-A020 Power Point, 10 pages.

* cited by examiner

PREDICTIVE ADAPTIVE SCAN ORDERING FOR VIDEO CODING

CROSS-REFERENCE TO RELATED APPLICATIONS

This application claims priority to the U.S. Provisional Application No. 61/252,443, by Lingzhi Lui et al., entitled "Predictive Adaptive Scan Ordering for Video Coding" filed on Oct. 16, 2009, which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The amount of video data needed to depict even a relatively short film can be substantial, for example when the data is to be streamed or otherwise communicated across a communications network with limited bandwidth capacity. Thus, video data is generally compressed prior to being communicated across modern day telecommunications networks. Video compression devices often use software and/or hardware at the source to encode the video data prior to transmission, thereby decreasing the quantity of data needed to represent digital video images. The compressed data is then received at the destination and decoded by a video decompression device that decodes the video data. As such, improved compress/decompression techniques that increase compression ratios without substantially reducing image quality are desirable due to limited network resources.

SUMMARY

In one embodiment, an apparatus comprising an inter-prediction motion compensation unit, a transform unit coupled to the inter-prediction motion compensation unit, a quantization unit coupled to the transform unit such that the transform unit is positioned between the inter-prediction motion compensation unit and the quantization unit, a scanning unit coupled to the quantization unit such that the quantization unit is positioned between the transform unit and the scanning unit, and an adaptive scan order predictor unit coupled to the inter-prediction motion compensation unit, the quantization unit, and the scanning unit.

In another embodiment, the disclosure includes an apparatus comprising, an entropy decoding unit, an inverse scanning unit coupled to the entropy decoding unit, an inverse quantization unit coupled to the inverse scanning unit such that the inverse scanning unit is positioned between the entropy coding unit and the inverse quantization unit, and an adaptive scan order predictor unit coupled to the entropy decoding unit and the inverse scanning unit.

In yet another embodiment, the disclosure includes a method comprising receiving a plurality of two dimensional (2D) arrays of quantized transform coefficients associated with a plurality of inter-prediction modes and/or a plurality of motion vectors for a first frame in a sequence of frames, initializing a plurality of absolute quantized transform coefficient matrices and a plurality of corresponding 2D scan order arrays for the inter-prediction modes and/or the motion vectors, receiving a second plurality of 2D arrays of quantized transform coefficients associated with the same inter-prediction modes for a second frame in the sequence of frames, updating the absolute quantized transform coefficient matrices and the corresponding 2D scan order arrays for the inter-prediction modes and/or the motion vectors, and scanning the second 2D arrays of quantized transform coefficients of the second frame according to a plurality of corresponding predicted scanning pattern defined by the corresponding 2D scan order arrays.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
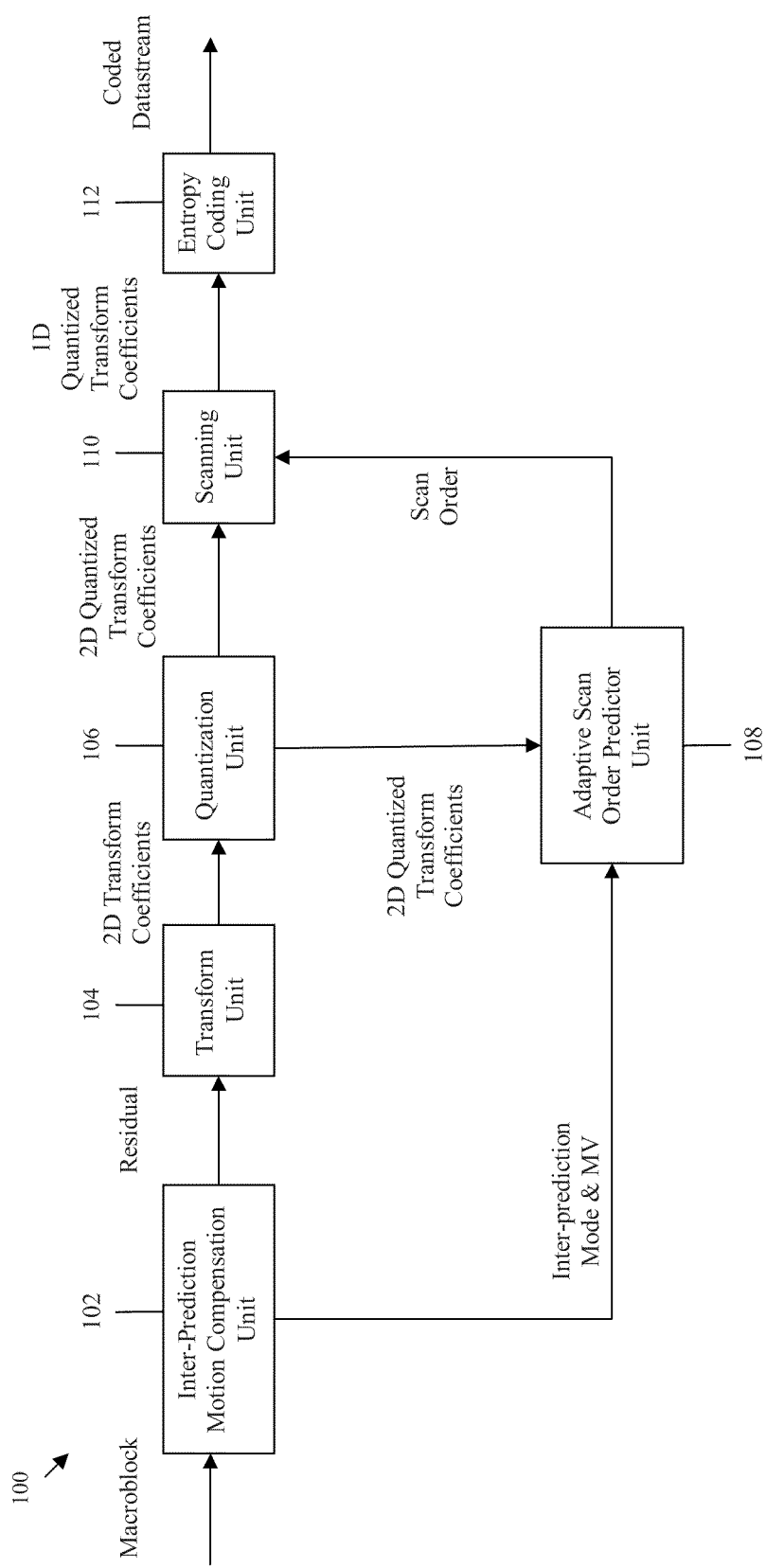
FIG. 1 is a schematic diagram of an embodiment of a video encoder architecture.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Typically, video media involves displaying a sequence of still images or frames in relatively quick succession, thereby causing a viewer to perceive motion. Each frame may comprise a plurality of picture elements or pixels, each of which may represent a single reference point in the frame. During digital processing, each pixel may be assigned an integer value (e.g. 0, 1, . . . or 256) that represents an image quality or characteristic, such as luminance or chrominance, at the corresponding reference point. Successive frames may be substantially correlated, such that a group of pixels or macroblock in a frame does not substantially vary from a corresponding group of pixels or macroblock in a successive frame.

Modern video encoder (or codecs) may make use of temporal redundancies in a sequence of frames, e.g. similarities between corresponding macroblocks of successive frames, to reduce the amount of data used for representing a sequence of frames. The codecs may calculate residual values (e.g. for pixels) by implementing a motion-compensated inter-prediction algorithm, which may de-correlate two corresponding macroblocks, such as implemented in International Telecommunications Union (ITU) Telecommunications Standardization Sector (ITU-T) H.264 or International Organization for Standardization (ISO)/International Electrotechnical Commission (IEC) Moving Picture Experts Group (MPEG) standards. One function of the motion-compensated inter-prediction algorithm may be to represent corresponding macroblocks into matrices of varying sizes and orientations, e.g. 16×16, 16×8, ... n×m (n and m are integers). The matrices may comprise residual values for the pixels in the macroblocks. The varying size matrices may correspond to a plurality of inter-prediction modes and/or motion vectors, which may be selected based on the characteristics of the macroblocks. The matrices may then be transformed and quantized into 2D arrays of quantized transform coefficients. The 2D arrays of quantized transform coefficients may also be referred to as quantized coefficient summation matrixes, and the two terms are used interchangeably herein. The 2D arrays of quantized transform coefficients may then be scanned in a predefined scanning pattern, e.g. a zig-zag pattern, to generate a 1D string of quantized transform coefficients, which may then be entropy encoded and transmitted over a network.

The entropy encoding may reduce the quantity of redundant values or coefficients, e.g. zero coefficients, in the 1D string of quantized transform coefficients, and thus reduce the amount of transmitted data. The efficiency of entropy encoding may be affected by the number of consecutive zero coefficients that are scanned, and hence may vary for different scanning patterns. For example, the performance of the source encoder or codec may increase as the number of consecutive zero coefficients located at the end of the scanned sequence increases since the encoder may represent consecutive trailing zeros in a datastream using an abbreviated symbol, e.g. an end of block (EOB) symbol. Since the 2D arrays of quantized transform coefficients may comprise random sequences of zero and non-zero coefficients, a predefined scanning pattern, e.g. a zig-zag pattern, may not always result in a shortest possible entropy coded datastream, such as a 1D string of quantized transform coefficients with the highest number of zero coefficients at the end of the sequence.

Disclosed herein is a method and apparatus for providing adaptive scanning patterns for the 2D arrays of quantized transform coefficients, which may be based on their corresponding inter-prediction modes and/or motion vectors. The scanning pattern used for a 2D array of quantized transform coefficients in a frame may be determined from one or more corresponding 2D arrays of quantized transform coefficients of the same inter-prediction mode and/or motion vectors in previous frames. The scanning patterns of 2D arrays of quantized transform coefficients may be based on a descending order of coefficients in the corresponding 2D arrays of quantized transform coefficients for the same inter-prediction mode and/or motion vectors in a previous frame, which may result in more trailing zero coefficients at the end of the process and hence improve entropy encoding efficiency. Additionally, scanning the coefficients corresponding to a frame in a descending order may lead to scanning subsequent coefficients corresponding to subsequent frames in a similar descending order, which may further improve the entropy coding efficiency. For example, a sequence of ordered coefficients in the 1D string may lead to a similarly ordered sequence of coefficients for subsequent frames. The adaptive scan pattern method may also be implemented at the destination decoder or codec to derive the adaptive scan order during decoding without the need to transmit additional information or parameters about the adaptive scan order from the source codec.

FIG. 1 illustrates an embodiment of an encoder 100 which may implement an inter-frame compression technique to compress video data. The encoder 100 may comprise an inter-prediction motion compensation unit 102, a transform unit 104, a quantization unit 106, an adaptive scan order predictor 108, a scanning unit 110, and an entropy coding unit 112, which may be arranged as shown in FIG. 1 and implemented using hardware, software, or both. The inter-prediction motion compensation unit 102 may receive a plurality of sequenced frames, e.g. 1, 2, 3 . . . (N−1), N, which may be subdivided into one or more group of pictures (GOP), e.g. [1-7], [8-14], . . . [(N−7)−N] (N is an integer). Each GOP may comprise at least one reference frame and a plurality of predicted frames (P-Frames). In some embodiments, the GOP may comprise varying tiers of reference and/or predicted frames, e.g. intra-coded frames (I-frames), P-frames, bi-directionally predicted frames (B-frames), etc. The term "reference frame" may refer to any frame, e.g. an I-frame or a P-frame, used in conjunction with predictive data to construct another frame during decompression. The term "P-frame" may refer to any frame, e.g. a P-frame or a B-frame, that may be constructed using another frame, e.g. an I-frame or a P-frame, during decompression.

In some embodiments, the terms "reference frame" and "P-frame" may not be mutually exclusive, in that a single frame may be referred to as a reference frame in one context and a P-frame in the same or another context. For instance, a frame may be transmitted and/or stored as an inter-coded frame, e.g. a frame that is expressed in terms of one or more neighboring frames, but may also act as a reference frame for one or more additional frames. As such, referring to a frame as a reference frame or as a P-frame herein is done for illustrative purposes only, and should not be interpreted as limiting in any manner. Further, each frame may comprise a plurality of groups of pixels or macroblocks of varying sizes and/or orientations, e.g. 16×16, 16×8, 8×16, 8×8, . . . n×m. The term "macroblock" may refer to any grouping of pixels, regardless of size and/or orientation. In some embodiments, some macroblocks may be further partitioned into smaller groups of pixels, which may also be referred to as macroblocks.

The inter-prediction motion compensation unit 102 may be any device configured to receive a plurality of macroblocks, for example, associated with a sequence of P/B-frames or a GOP. The inter-prediction motion compensation unit 102 may process some of the macroblocks using an inter-prediction motion compensation algorithm, thereby generating one or more matrices of residual values according to one or more inter-prediction modes, e.g. 1, 2, . . . M (M is an integer). Additionally or alternatively, the macroblocks may be processed to obtain matrices of residual values according to and/or associated with one or more motion vectors (MVs). In some embodiments, the residual values may correspond to differential values obtained for a macroblock from one frame, e.g. a P/B-frame, and a corresponding macroblock from another frame, e.g. a reference frame. The inter-prediction motion compensation unit 102 may forward the residual values to the transform unit 104 and indicate the corresponding inter-prediction mode and/or motion vectors to the adaptive scan order predictor 108.

The transform unit 104 may be any device configured to transform the residual values, e.g. that correspond to the different inter-prediction modes, from the spatial domain to the frequency domain e.g. using an integer transform, thereby generating a 2D array of transform coefficients for each inter-prediction mode. In an embodiment, the 2D arrays of transform coefficients may be associated with different inter-prediction modes, different MVs, or combinations thereof. The transform unit 104 may then forward the 2D array of transform coefficients to the quantization unit 106.

The quantization unit 106 may be any device configured to quantize the elements of the 2D array of transform coefficients, e.g. frequency components, of which some may be attenuated and/or rounded to the nearest integer. For example, the quantization unit 106 may divide the 2D array of transform coefficients by a quantization matrix, which may be chosen based on a corresponding image quality parameter of the 2D array of transform coefficients, to obtain a plurality of corresponding 2D arrays of quantized transform coefficients. The elements of the obtained 2D arrays of quantized transform coefficients may then be rounded to the nearest integer. In some cases, some elements in the resulting 2D array of quantized transform coefficients may be rounded to zero. The quantization unit 106 may then forward the 2D array of quantized transform coefficients to the scanning unit 110 and the adaptive scan order predictor 108.

The adaptive scan order predictor 108 may be any device configured to predict a scanning pattern for the 2D array of quantized transform coefficients of each inter-prediction mode and/or MV based on a corresponding 2D array of quantized transform coefficients obtained from a preceding frame, e.g. for the same inter-prediction mode and/or MV. The adaptive scan order predictor 108 may initialize an absolute quantized coefficient summation matrix, e.g. $S_1[16][16]$, $S_2[16][8]$ . . . $S_M[n][m]$, for each inter-prediction mode and/or M adaptive scan order predictor 108 may then add the absolute value of the elements of the 2D array of quantized transform coefficients of each inter-prediction mode and/or MV to the corresponding elements of the absolute quantized coefficient summation matrix of the same inter-prediction mode and/or MV. Subsequently, e.g. after each frame, the adaptive scan order predictor 108 may predict a scanning pattern for each inter-prediction mode and/or MV by sorting the elements of the corresponding absolute quantized coefficient summation matrix, e.g. $S_i[n][m]$, in descending order. The adaptive scan order predictor 108 may then store the indices of the sorted elements in a 2D scan order array, e.g. $O_i[a_{j,k}, a_{j',k'}, \ldots, a_{j'',k''}]$ (where $a_{j,k} > a_{j',k'} > a_{j'',k''}$), where i is an integer that indicates an inter-prediction mode (and/or MV), and j and k are integers that indicate a row and column, respectively. As such, each 2D scan order array may list the indices of the elements of the corresponding absolute quantized coefficient summation matrix that are sorted in descending order. For example, the absolute quantized coefficient summation matrix $S_i$ below may have the following 2D scan order array $O_i$:

$$S_i = \begin{bmatrix} 7 & 9 & 5 & 0 \\ 4 & 3 & 2 & 1 \\ 0 & 8 & 0 & 0 \\ 0 & 0 & 6 & 0 \end{bmatrix} \quad O_i = \begin{bmatrix} a_{1,2} & a_{3,2} & a_{1,1} & a_{4,3} \\ a_{1,3} & a_{2,1} & a_{2,2} & a_{3,1} \\ a_{2,4} & - & - & - \\ - & - & - & - \end{bmatrix}$$

In the above example, the scan order array $O_i$ lists the indices of the sorted elements of $S_i$ in descending order, e.g. $a_{1,2}[9], a_{3,2}[8], a_{1,1}[7], a_{4,3}[6] \ldots a_{2,4}[1]$. The null symbols (–) above may refer to the zero-coefficient indices. The order and value of the elements in the absolute quantized coefficient summation matrix may be maintained during the sorting process. The adaptive scan order predictor 108 may forward the 2D scan order arrays, e.g. that correspond to the different inter-prediction modes and/or MVs to the scanning unit 110, e.g. after processing each frame.

The scanning unit 110 may be any device configured to scan and convert each 2D array of quantized transform coefficients into a corresponding 1D string of quantized transform coefficients. The scanning unit 110 may scan each 2D array of quantized transform coefficients according to the corresponding 2D scan order array. For instance, a first P-frame in a sequence of frames may be first scanned according to a standard scanning pattern, e.g. a zig-zag pattern, and subsequently successive P-frames may be scanned according to the scanning patterns predicted by the adaptive scan order predictor 108. In some embodiments, the scanning unit 110 may abort the scan after scanning the last non-zero coefficient or a first zero coefficient, e.g. upon reaching a null symbol in the 2D scan order array. Alternatively, the scanning unit 110 may scan the entire 2D array of quantized transform coefficients such that each of the trailing zero coefficients at the end of the sequence may be included in the resulting 1D string of quantized transform coefficients. The resulting 1D string of quantized transform coefficients may then be forwarded to the entropy coding unit 112.

The entropy coding unit 112 may be any device configured to convert the received 1D string of quantized transform coefficients into a coded datastream via entropy encoding, such as context-adaptive variable length coding (CAVLC) or context adaptive binary arithmetic coding (CABAC), to compress data before transmission. Some entropy encoding methods, e.g. CAVLC, may abbreviate a sequence of consecutive trailing zeros using an abbreviated symbol, e.g. EOB symbol. As such, the amount of data required to represent a sequence of bits may decrease as the number of consecutive trailing zeros, e.g. at the end of the datastream, increases. The entropy coding unit 112 may forward the coded datastream to a transmitter (not shown), which may transmit the data across a communications network.

Figure 2:
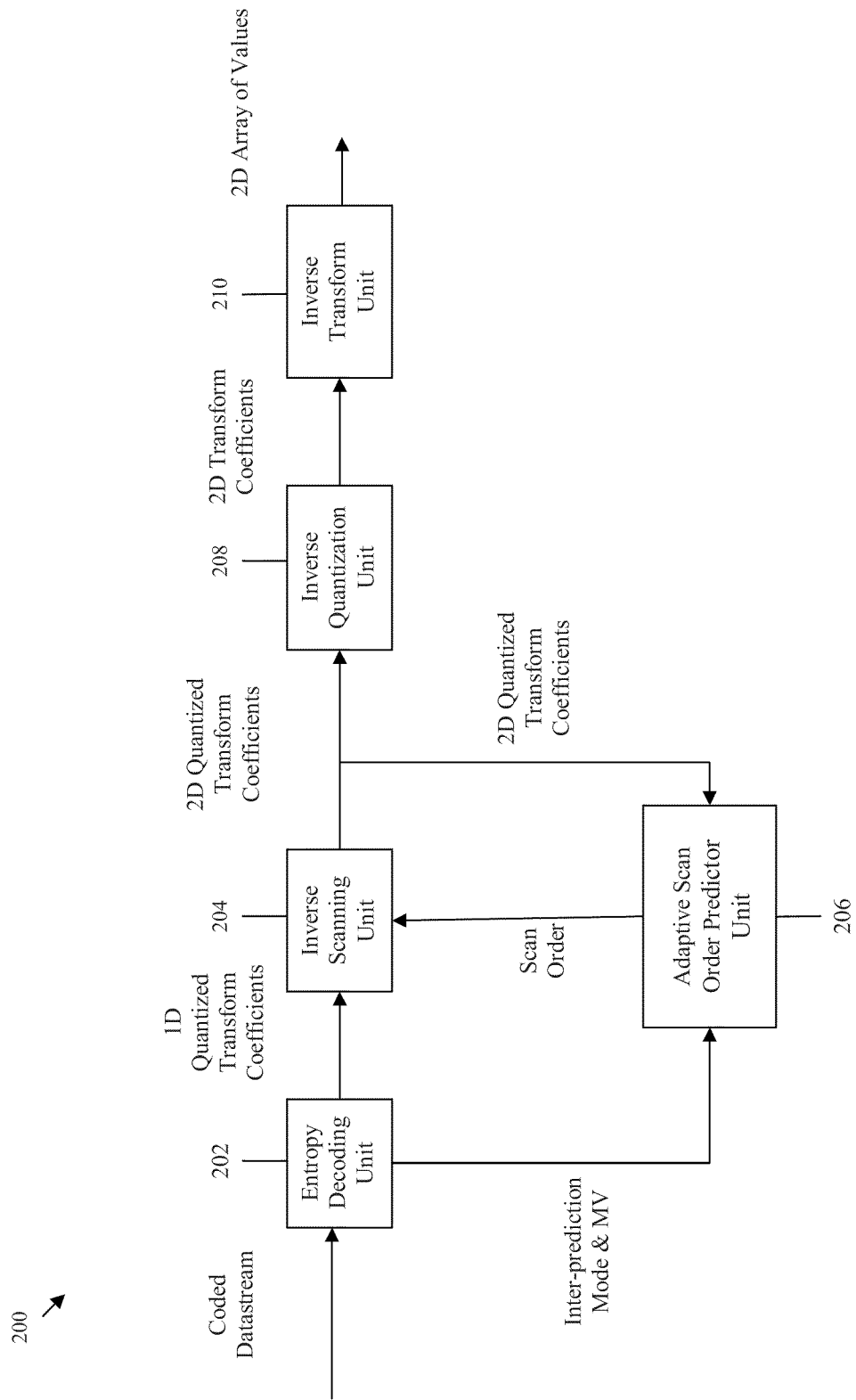
FIG. 2 is a schematic diagram of an embodiment of a video decoder architecture.

FIG. 2 illustrates a decoder 200 which may implement an inter-frame decompression technique at the receiver side, e.g. to decode the coded datastream from the encoder 100. The decoder 200 may comprise an entropy decoding unit 202, an inverse scanning unit 204, an adaptive scan order predictor 206, an inverse quantization unit 208, and an inverse transform unit 210, which may be arranged as shown in FIG. 2 and implemented using hardware, software, or both. In some embodiments, the encoder 100 and the decoder 200 may be implemented on the same device, e.g. a single network node. In the same or alternative embodiments, the encoder 100 and decoder 200 may be implemented on separate devices, e.g. at a source node and a destination node, respectively.

The entropy decoding unit 202 may be any device configured to receive and decode the coded datastream to reconstruct the 1D strings of quantized transform coefficients, such as those generated by the scanning unit 110. Additionally, the entropy decoding unit 202 may determine the inter-prediction modes corresponding to the received 1D strings of quantized transform coefficients upon decoding the coded datastream. The entropy decoding unit 202 may then forward the 1D strings of quantized transform coefficients to the inverse scanning unit 204. The entropy decoding unit 202 may also indicate the inter-prediction modes of the received 1D strings of quantized transform coefficients to the adaptive scan order predictor 206.

The adaptive scan order predictor 206 may be any device configured to generate a 2D scan order array for each inter-prediction mode and/or MV associated with each frame based on the corresponding 2D arrays of quantized transform coefficients. The adaptive scan order predictor 206 may implement a similar adaptive scan method to that of the adaptive scan order predictor 108 to generate the 2D scan order arrays, e.g. using an absolute quantized transform coefficient summation matrix $S_i$ and a 2D scan order array $O_i$ for each inter-prediction mode i. The adaptive scan order predictor 206 may forward the 2D scan order arrays to the inverse scanning unit 204, which may use the arrays to scan the 1D strings of quantized transform coefficients in the predicted order, as described below.

The inverse scanning unit 204 may be any device configured to scan the 1D strings of quantized transform coefficients to process each 1D string of quantized transform coefficients corresponding to each inter-prediction mode and/or MV. The inverse scanning unit 204 may first scan the 1D strings of quantized transform coefficients for the inter-prediction modes associated with a first frame, e.g. a P-frame, according to a standard scanning pattern, e.g. a zig-zag pattern, and reconstruct the corresponding 2D arrays of quantized transform coefficients. The inverse scanning unit 204 may then scan the 1D string of quantized transform coefficients (for the corresponding inter-prediction modes) associated with the subsequent frames, e.g. P-frames, according to predicted scanning patterns indicated by the adaptive scan order predictor 206, and reconstruct the corresponding 2D arrays of quantized transform coefficients accordingly. The inverse scanning unit 204 may forward the 2D arrays of quantized transform coefficients to the adaptive scan order predictor 206 and the inverse quantization unit 208.

The inverse quantization unit 208 may be any device configured to process the 2D arrays of quantized transform coefficients appropriately, e.g. to de-quantize the 2D arrays of quantized transform coefficients. For example, the inverse quantization unit 208 may multiply the 2D array of transform coefficients by a quantization matrix that is substantially similar to the corresponding quantization matrix used by the quantization unit 106 during encoding. In some embodiments, the process of quantization and/or inverse quantization may be lossy, where the 2D arrays of transform coefficients provided by the inverse quantization unit 208 may not exactly match the original 2D arrays of transform coefficients that were sent to the quantization unit 106.

The inverse transform unit 210 may be any device configured to process the 2D arrays of transform coefficients appropriately, e.g. to convert each 2D array of transform coefficients into a corresponding 2D array of values. For example, the inverse transform unit 210 may implement an inverse transform function, e.g. that is substantially the inverse of the transform used by the transform unit 104, on the 2D array of transform coefficients to generate the corresponding 2D array of values. In some embodiments, portions of the encoding/decoding process may be lossy in nature such that the 2D array of values may be similar, but not identical, to the residual value matrix. The inverse transform unit 210 may send the resulting 2D array of values to a processing device (not shown) for further processing.

Figure 3:
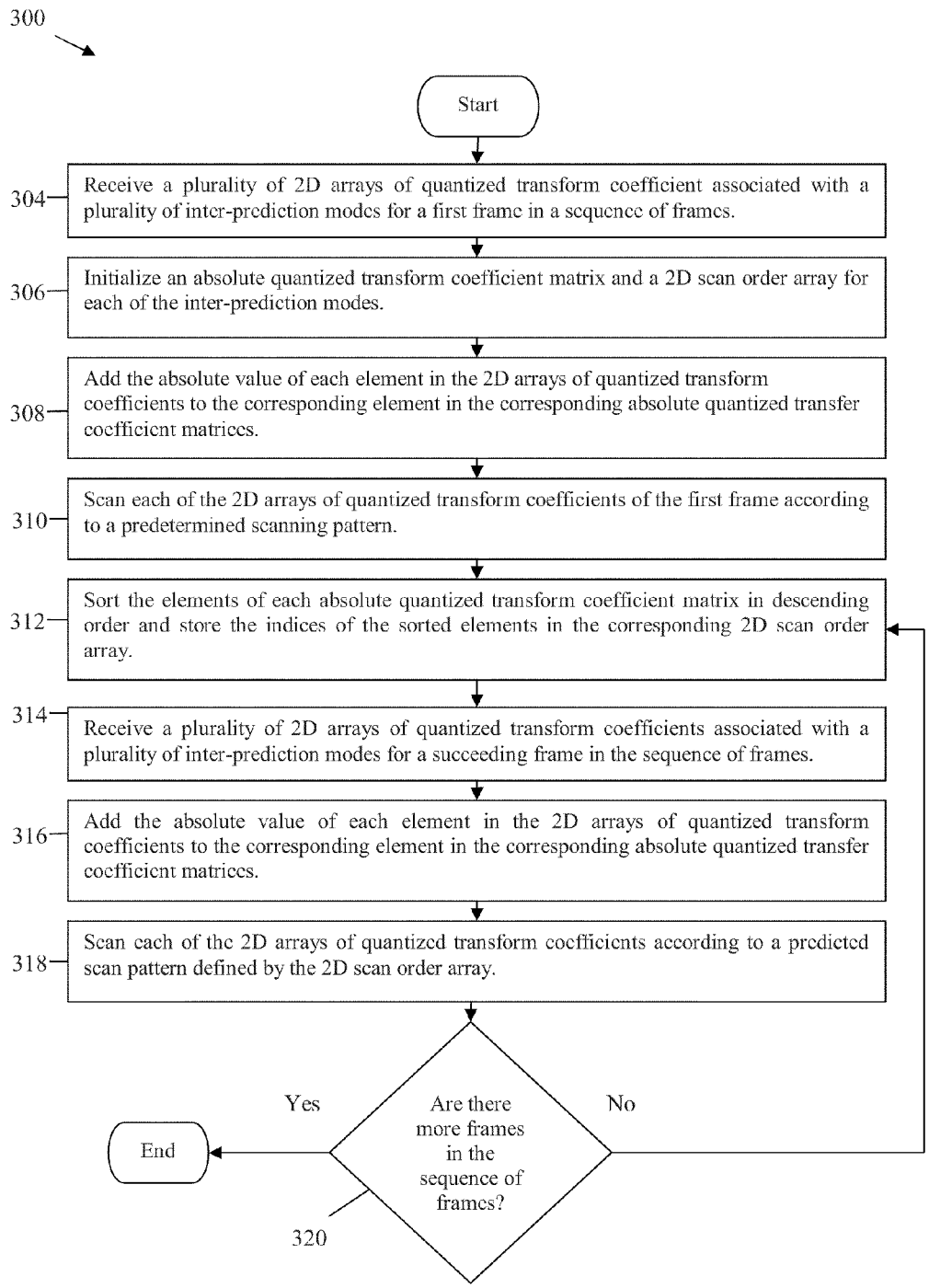
FIG. 3 is a flowchart of an embodiment of an adaptive scan encoding method.
Figure 4A:
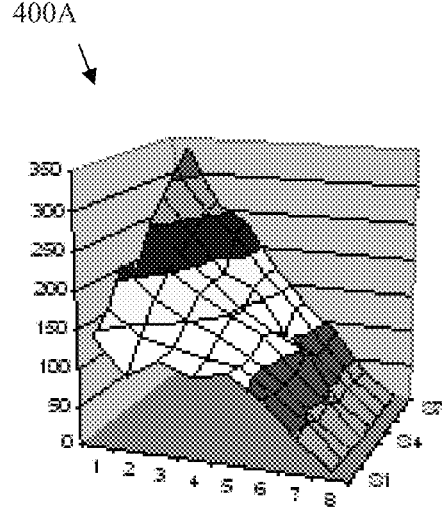
FIGS. 4A, 4B, 4C, and 4D are charts of embodiments of quantized coefficient summation matrices.
Figure 4B:
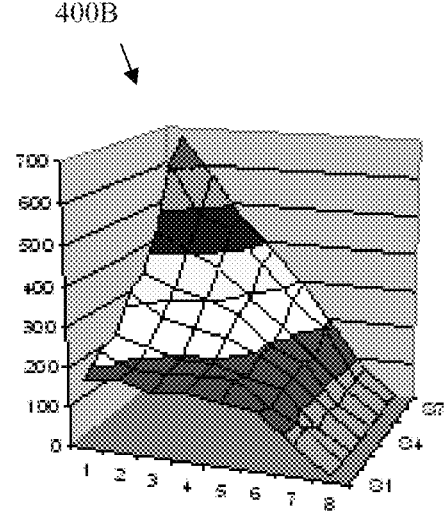
Figure 4C:
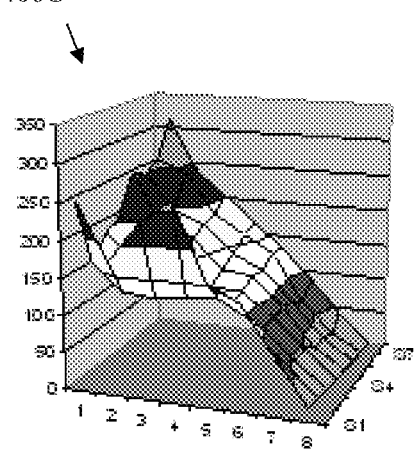
Figure 4D:
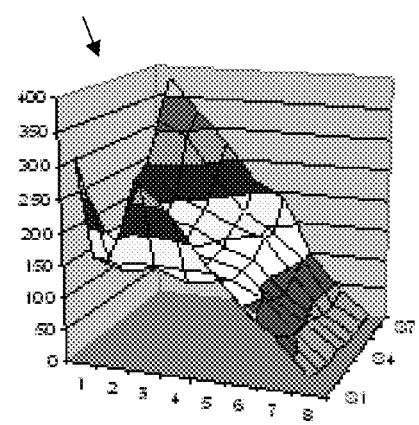

FIG. 3 illustrates an embodiment of an adaptive scan video encoding/decoding method 300, which may be implemented by the encoder 100 and/or the decoder 200. For instance, portions of the adaptive video encoding/decoding method 300 may be implemented by the adaptive scan order predictor 108 and/or the adaptive scan order predictor 206. At block 304, a plurality of 2D arrays of quantized transform coefficients associated with a plurality of inter-prediction modes for a first frame (e.g. a P-frame) in a sequence of frames may be received. At block 306, an absolute quantized transform coefficient matrix (e.g. $S_i$) and a 2D scan order array (e.g. $O_i$) may be initialized for each inter-prediction mode. At block 308, the absolute value of each element in the 2D arrays of quantized transform coefficients may be added to the corresponding element in the corresponding absolute quantized transform coefficient matrices. At block 310, each 2D array of quantized transform coefficients associated with a first frame may be scanned according to a predetermined scanning pattern, e.g. a zig-zag scanning pattern. At block 312, the elements of each absolute quantized transform coefficient matrix may be sorted in descending order and the indices of the sorted elements may be stored in the corresponding 2D scan order array. At block 314, a plurality of 2D arrays of quantized transform coefficients associated with a succeeding frame (e.g. a P-frame) in the sequence of frames may be received. At block 316, the absolute value of each element in the 2D arrays of quantized transform coefficients may be added to the corresponding element in the corresponding absolute quantized transform coefficient matrices, e.g. that correspond to the same inter-prediction mode. At block 318, each 2D array of quantized transform coefficients associated with the succeeding frame may be scanned according to a predicted scan pattern defined by the corresponding 2D scan order array. At block 320, the method 300 may determine whether there are more frames in the sequence of frames. If the condition in block 320 is met, then the method 300 may return to block 312, e.g. to process any additional frames. Otherwise, the method 300 may end.

In an embodiment, the adaptive scan video encoding/decoding method 300 may comprise at least the following or similar code:

```
if this is an I-frame {
    do nothing
}
if this is P-frame {
    if this is the first P frame following an I frame {
        initialize a set of 2D arrays { S_1[n][n], S_2[n][n], ..., S_m[n][n]} m is the number of
        inter prediction mode and/or motion vector.
        for each block of size nxn{
            scan order for all the block in the first frame is the standard zig-zag
            pattern.
            add the quantized coefficients of this block to S_i[n][n], i is the selected
            inter prediction mode for this block.
        }
        for each inter prediction mode{
            sort the values in S_i[n][n] to descending order, while sorting, keep the
            original indices of each value in order.
            construct an 2D array with ordered original indices. This will become the
            new scan order for this mode and/or motion vector in next P frame.
        }
```

```
        }
        else {
            initialize a set of 2D arrays { S₁[n][n], S₂[n][n], ..., S_m[n][n]} m is the number of
            inter prediction mode and/or motion vector.
            for each block of size nxn{
                scan the quantized coefficients using the new scan order generated while
                encoding/decoding the previous P frame
                add the quantized coefficients of this block to S_i[n][n], i is the selected
                inter prediction mode for this block.
            }
            for each inter prediction mode{
                sort the values in S_i[n][n] to descending order, while sorting, keep the
                original indices of each value in order.
                construct an 2D array with ordered original indices. This will become the
                new scan order for this mode and/or motion vector in next P frame.
            }
        }
    }
    if this is B-frame {
        if this is the first B frame following an I/P frame {
            initialize a set of 2D arrays { S₁[n][n], S₂[n][n], ..., S_m[n][n]} m is the number of
            inter prediction mode and/or motion vector.
            for each block of size nxn{
                scan order for all the block in the first frame is the standard zig-zag
                pattern.
                add the quantized coefficients of this block to S_i[n][n], i is the selected
                inter prediction mode for this block.
            }
            for each inter prediction mode{
                sort the values in S_i[n][n] to descending order, while sorting, keep the
                original indices of each value in order.
                construct an 2D array with ordered original indices. This will become the
                new scan order for this mode and/or motion vector in next B frame.
            }
        }
        else {
            initialize a set of 2D arrays { S₁[n][n], S₂[n][n], ..., S_m[n][n]} m is the number of
            inter prediction mode and/or motion vector.
            for each block of size nxn{
                scan the quantized coefficients using the new scan order generated while
                encoding/decoding the previous B frame
                add the quantized coefficients of this block to S_i[n][n], i is the selected
                inter prediction mode for this block.
            }
            for each inter prediction mode{
                sort the values in S_i[n][n] to descending order, while sorting, keep the
                original indices of each value in order.
                construct an 2D array with ordered original indices. This will become the
                new scan order for this mode and/or motion vector in next B frame.
            }
        }
    }
}
```

As described above, the predicted scanning pattern may correspond to the different inter-prediction modes and/or MVs associated with the received 2D arrays of quantized transform coefficients. In some embodiments, the predicted scanning patterns may be generated for a plurality of 2D arrays of quantized transform coefficients that correspond to a combination of different inter-prediction modes and/or MVs. Since the adaptive scan video encoding/decoding method 300 may be implemented substantially similarly at the encoder and the decoder, there may be no need to send additional processing information from the encoder to the decoder, e.g. information about the predicted scan order for each inter-prediction mode. Thus, the method 300 may provide transmission gain, e.g. by improving entropy coding efficiency and reducing the amount of transmitted trailing coefficients in the 1D strings, without transmitting additional information, e.g. about the predicted scan patterns.

FIGS. 4A-D illustrate a graphical representation of quantized coefficient summation matrices, which may also referred to as 2D arrays of quantized transform coefficients. The quantized coefficient summation matrices comprise a matrix 400A that corresponds to a first P-frame and a first inter-prediction mode 16×16 and a matrix 400B that corresponds to a second P-frame and the first inter-prediction mode 16×16. The quantized coefficient summation matrices also comprise a matrix 400C that corresponds to the first P-frame and a second inter-prediction mode 16×8 and a matrix 400D that corresponds to the second P-frame and the second inter-prediction mode 16×8. As shown, the matrices 400A and 400B that correspond to the first frame and the second frame, respectively, and to the same first inter-prediction mode may be substantially similar. This may indicate that the elements of the 2D arrays of quantized transform coefficients corresponding to the two frames and the same inter-prediction mode may be substantially similar.

The same observation may be made for the matrices 400C and 400D that also correspond to the two frames and another common inter-prediction mode between the two matrices. However, the matrices associated with different inter-prediction modes, e.g. 16×16 and 16×8, may not be similar regardless of whether they correspond to the same or different frames. The observation above may support the use of the adaptive scan video encoding/decoding scheme on an inter-prediction mode basis, e.g. for each inter-prediction mode between a plurality of frames but not between a plurality of inter-prediction nodes. Accordingly, an absolute quantized coefficient matrix $S_i$ and corresponding 2D scan order array $O_i$ may be needed for each inter-prediction mode i, as shown above. The same observations may also be made for different frames associated with different MVs or inter-prediction mode/MV combinations. Thus, the adaptive scan video encoding/decoding scheme may also be implemented on an MV basis, e.g. by using a matrix $S_i$ and a corresponding 2D array $O_i$ for each MV i, or on an inter-prediction mode/MV combination basis, e.g. by using a matrix $S_i$ and a corresponding 2D array $O_i$ for each inter-prediction mode/MV combination i.

Tables 1 and 2 below show two quantized summation matrices for two consecutive frames (e.g. first P-frame and second P-frame) and the same inter-prediction mode 16×8. To show the distribution of coefficients, the values in the matrices are divided into three different regions according to their values. In each table, a first region covers values from 0 to 99, a second region covers values from 100-199, and a third region covers values above 200. The three regions in each of the two tables are illustrated using underlines; double underline, regular, and underline. As shown below, the regions in table 1 substantially match the regions in table 2. Thus, the regions of the second frame may be predicted based on the corresponding regions of the first frame, for instance using the method 300.

TABLE 1

| 315 | 169 | 286 | 237 | 173 | 122 | 80 | 26 |
|---|---|---|---|---|---|---|---|
| 152 | 135 | 145 | 127 | 136 | 83 | 65 | 17 |
| 177 | 132 | 147 | 132 | 122 | 99 | 49 | 11 |
| 175 | 162 | 145 | 135 | 123 | 80 | 49 | 13 |
| 237 | 179 | 170 | 142 | 125 | 77 | 40 | 5 |
| 253 | 205 | 185 | 163 | 147 | 89 | 30 | 3 |
| 318 | 292 | 227 | 175 | 142 | 101 | 31 | 6 |
| 382 | 326 | 277 | 215 | 190 | 95 | 38 | 3 |

C<300
300 ≤ C < 100
C ≤ 100

TABLE 2

| 257 | 179 | 235 | 265 | 165 | 143 | 81 | 20 |
|---|---|---|---|---|---|---|---|
| 162 | 127 | 123 | 127 | 132 | 108 | 57 | 14 |
| 193 | 150 | 140 | 141 | 112 | 85 | 43 | 10 |
| 207 | 191 | 138 | 117 | 116 | 84 | 47 | 7 |
| 258 | 180 | 171 | 131 | 125 | 87 | 32 | 6 |
| 246 | 198 | 179 | 141 | 122 | 79 | 32 | 3 |
| 261 | 241 | 186 | 159 | 135 | 67 | 25 | 2 |
| 313 | 237 | 203 | 166 | 132 | 87 | 41 | 3 |

C<300
300 ≤ C < 100
C ≤ 100

Table 3 shows an average bit reduction achieved using the adaptive scan scheme above in comparison to a JM 15.1 algorithm described in http://iphome.hhi.delsuehring, which is incorporated herein by reference as if reproduced in its entirety. The two schemes (or algorithms) were implemented for a GOP that has an IPPP frame structure. Rate-distortion optimization (RDO) and CAVLC entropy coding were also used with a transform size of 8×8 that determines one inter-prediction mode. The remaining parameters were similar to the ones described in the JM 15.1 reference. The values in table 3 are shown using the two schemes for four different Common Intermediate Format (CIF) sequences: flower, coastguard, city, and mobile. Each sequence was encoded using quantization parameters: 23, 28, 33, and 38 for about 60 P-frames.

The average bits reduction for the 60 frames was calculated based on the Bjøntegaard measurement method, which is presented by G. Bjøntegaard in "Calculation of Average PSNR Differences Between RD-Curves," which is published in *ITU-T Q.6/SG16 VCEG-m33*, April 2001, and is incorporated herein by reference as if reproduced in its entirety. The values in Table 3 indicate that the proposed adaptive scan sequence may reduce the bits used for coding one P-frame by about 3.6% on average and up to about 5.63% with similar peak signal-to-noise (PSNR) ratios achieved using the JM 15.1 algorithm.

TABLE 3

| | QP | PSNR (Y) (JM 15.1) | P frame average bits/frame (JM 15.1) | PSNR (Y) (proposed) | P-frame average bits/frame (proposed) | Average bit increase |
|---|---|---|---|---|---|---|
| Ave. | | | | | | −3.62% |
| flower | 23 | 40.97 | 109999 | 40.98 | 104115 | −5.63% |
| | 28 | 36.25 | 62476 | 36.28 | 59009 | |
| | 33 | 31.70 | 30932 | 31.78 | 29589 | |
| | 38 | 27.19 | 12145 | 27.27 | 11808 | |
| coastguard | 23 | 39.59 | 98366 | 39.60 | 94515 | −4.70% |
| | 28 | 35.43 | 52347 | 35.46 | 50299 | |
| | 33 | 31.56 | 22197 | 31.65 | 21508 | |
| | 38 | 28.19 | 6848 | 28.26 | 6746 | |
| city | 23 | 39.37 | 44469 | 39.44 | 43990 | −2.00% |
| | 28 | 35.46 | 18472 | 35.53 | 18292 | |
| | 33 | 31.91 | 7776 | 31.96 | 7747 | |
| | 38 | 28.64 | 3098 | 28.63 | 3072 | |
| mobile | 23 | 39.74 | 153130 | 39.74 | 149276 | −2.15% |
| | 28 | 34.99 | 80933 | 35.02 | 79112 | |
| | 33 | 30.49 | 32378 | 30.54 | 32044 | |
| | 38 | 26.51 | 10660 | 26.52 | 10725 | |

Figure 5:
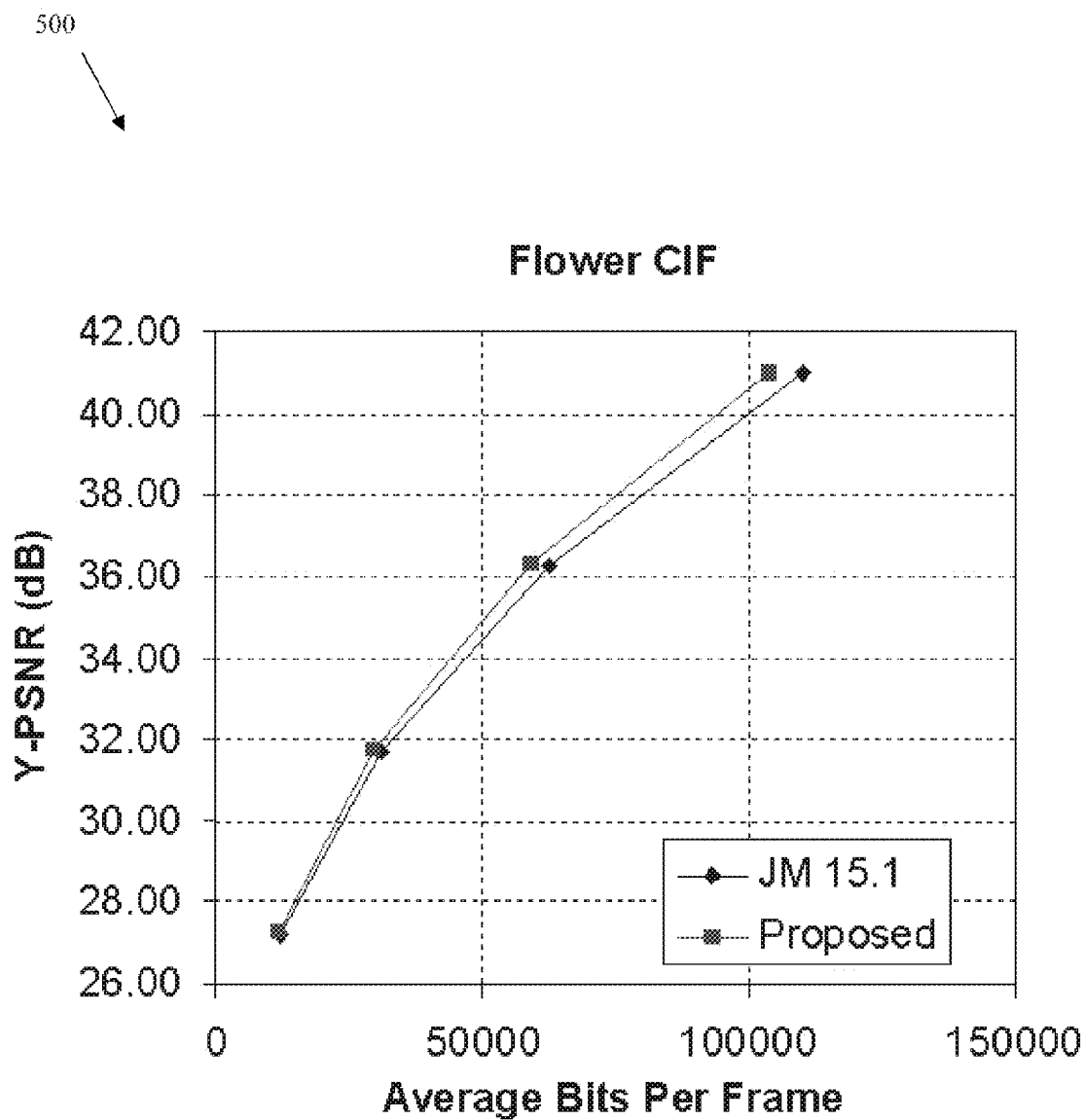
FIG. 5 is a chart of an embodiment of a rate distribution comparison.

FIG. 5 illustrates a rate-distribution comparison 500 for the flower CIF sequence between the two schemes. Specifically, a rate-distortion (RD) curve is shown that indicates the bits saving using the adaptive scan scheme instead of the standard JM 15.1 algorithm. The RD curve shows that the bits savings increase when the PSNR value, e.g. in decibel (dB), increases. Thus, the proposed adapted scan scheme for video encoding/decoding may result in additional bits saving for higher PSNR levels, which may be attributed to the quantization of transform coefficients in the matrices at the higher PSNR levels. The bit savings may be less substantial when the quantization parameter is not set to a relatively large value. When a substantially large portion of the coefficients are quantized to zero, the different scan orders (according to the predicted scanning patterns) may not substantially improve the bits savings or the entropy coding efficiency.

Figure 6:
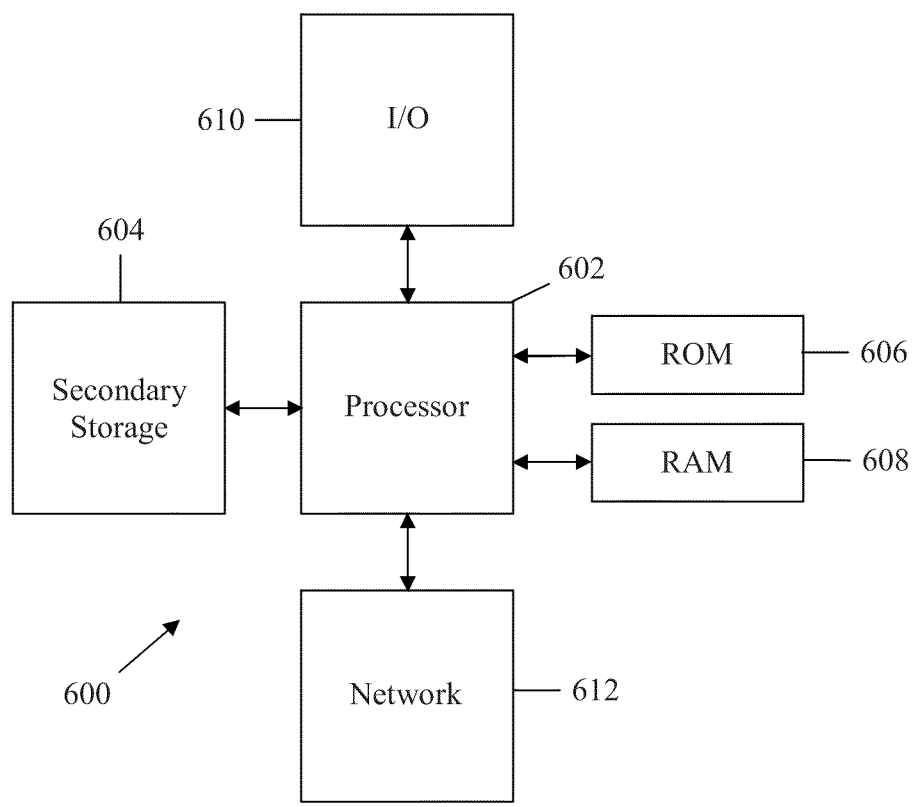
FIG. 6 is a schematic diagram of an embodiment of an exemplary general-purpose computer system suitable for implementing the several embodiments of the disclosure.

The network described above may be implemented on any general-purpose network component, such as a computer or network component with sufficient processing power, memory resources, and network throughput capability to handle the necessary workload placed upon it. FIG. 6 illustrates a typical, general-purpose network component suitable for implementing one or more embodiments of a node disclosed herein. The network component 600 includes a processor 602 (which may be referred to as a central processor unit or CPU) that is in communication with memory devices including secondary storage 604, read only memory (ROM) 606, random access memory (RAM) 608, input/output (I/O) 610 devices, and network connectivity devices 612. The processor may be implemented as one or more CPU chips, or may be part of one or more application specific integrated circuits (ASICs).

The secondary storage 604 is typically comprised of one or more disk drives or tape drives and is used for non-volatile storage of data and as an over-flow data storage device if RAM 608 is not large enough to hold all working data. Secondary storage 604 may be used to store programs that are loaded into RAM 608 when such programs are selected for execution. The ROM 606 is used to store instructions and perhaps data that are read during program execution. ROM 606 is a non-volatile memory device that typically has a small memory capacity relative to the larger memory capacity of secondary storage. The RAM 608 is used to store volatile data and perhaps to store instructions. Access to both ROM 606 and RAM 608 is typically faster than to secondary storage 604.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising: a scanning unit configured to scan a plurality of two dimensional (2D) arrays of quantized transform coefficients according to a plurality of 2D scan order arrays; and an adaptive scan order predictor unit coupled to the scanning unit, wherein the adaptive scan order predictor unit is configured to: provide the plurality of 2D scan order arrays that indicate different scanning patterns for the 2D arrays of quantized transform coefficients; maintain a plurality of absolute quantized coefficient summation matrices for the inter-prediction modes; and generate the 2D scan order arrays based on a descending order of the elements in the absolute quantized coefficient summation matrices, wherein the absolute quantized coefficient summation matrices comprise a plurality of cumulative absolute sums of the corresponding elements of the 2D arrays of quantized transform coefficients, and wherein the 2D scan order arrays comprise the indices of the elements of the absolute quantized coefficient summation matrices that are sorted in descending order.

2. The apparatus of claim 1, further comprising an inter prediction motion compensation unit, wherein the inter-prediction motion compensation unit is configured to generate a plurality of residual value matrices for a plurality of macroblocks in a frame based on a plurality of inter-prediction modes and/or a plurality of motion vectors.

3. The apparatus of claim 2, further comprising a transform unit couple to the inter prediction motion compensation unit, wherein the transform unit is configured to generate a plurality of two dimensional (2D) arrays of transform coefficients that correspond to the residual value matrices.

4. The apparatus of claim 3, further comprising a quantization unit couple to the transform unit, wherein the quantization unit is configured to covert the 2D arrays of transform coefficients into the plurality of 2D arrays of quantized transform coefficients.

5. The apparatus of claim 4, wherein the adaptive scan order predictor unit is configured to provide the plurality of 2D scan order arrays corresponding inter-prediction modes and/or motion vectors.

6. The apparatus of claim 5, wherein the scanning unit scans the 2D arrays of quantized transform coefficients to generate a plurality of corresponding one dimensional (1D) strings of quantized transform coefficients.

7. The apparatus of claim 6 further comprising an entropy coding unit coupled to the scanning unit such that the scanning unit is positioned between the quantization unit and the entropy coding unit.

8. The apparatus of claim 7, wherein the entropy coding unit is configured to scan the 1D strings of quantized transform coefficients and reduce the quantity of data in each of the 1D strings.

9. The apparatus of claim 8, wherein the quantized transform coefficients in the 1D strings are ordered in descending order, and wherein the entropy coding unit reduces the quantity of trailing coefficients at the end of the strings.

10. The apparatus of claim 1, wherein the absolute quantized coefficient summation matrices for the inter-prediction modes and/or the motion vectors are updated for each consecutive frame, and wherein the corresponding 2D scan order arrays are changed for each consecutive frame based on a descending order of the elements in the updated absolute quantized coefficient summation matrices.

11. The apparatus of claim 5, wherein the plurality of 2D scan order arrays indicate different scanning patterns for the 2D arrays of quantized transform coefficients based on a plurality of corresponding motion vectors associated with the macroblocks in the frame.

12. The apparatus of claim 1, wherein the 1D strings of quantized transform coefficients are transmitted without additional information about the scanning order for the corresponding 2D arrays of quantized transform coefficients.

13. An apparatus comprising: an inverse scanning unit configured to generate a plurality of two dimensional (2D) arrays of quantized transform coefficients from the plurality of 1D strings according to a plurality of 2D scan order arrays; and an adaptive scan order predictor unit coupled to the entropy decoding unit and the inverse scanning unit, wherein the adaptive scan order predictor unit is configured to: provide the plurality of 2D scan order arrays that indicate different scanning patterns for the 2D arrays of quantized transform coefficients; maintain a plurality of absolute quantized coefficient summation matrices for the inter-prediction modes; and generate the 2D scan order arrays based on a descending order of the elements in the absolute quantized coefficient summation matrices, wherein the absolute quantized coefficient summation matrices comprise a plurality of cumulative absolute sums of the corresponding elements of the 2D arrays of quantized transform coefficients, and wherein the 2D scan order arrays comprise the indices of the elements of the absolute quantized coefficient summation matrices that are sorted in descending order.

14. The apparatus of claim 13 further comprising: an inverse quantization unit coupled to the inverse scanning unit such that the inverse scanning unit is positioned between the entropy coding unit and the inverse quantization unit; and an inverse transform unit coupled to the inverse quantization unit such that the inverse quantization unit is positioned between the inverse scanning unit and the inverse transform unit.

15. A method comprising: acquiring a plurality of two dimensional (2D) arrays of quantized transform coefficients associated with a plurality of inter-prediction modes and/or a plurality of motion vectors for a first frame in a sequence of frames; initializing a plurality of absolute quantized transform coefficient matrices and a plurality of corresponding 2D scan order arrays for the inter-prediction modes and/or the motion vectors; acquiring a second plurality of 2D arrays of quantized transform coefficients associated with the same inter-prediction modes for a second frame in the sequence of frames; updating the absolute quantized transform coefficient matrices and the corresponding 2D scan order arrays for the inter-prediction modes and/or the motion vectors; and scanning the second 2D arrays of quantized transform coefficients of the second frame according to a plurality of corresponding predicted scanning pattern defined by the corresponding 2D scan order arrays, wherein the absolute quantized transform coefficient matrices are updated by adding the absolute values of the elements in the 2D arrays of quantized transform coefficients to the corresponding elements in the corresponding absolute quantized transfer coefficient matrices, and wherein the 2D scan order arrays are initialized by sorting the elements of the initialized absolute quantized transform coefficient matrices in descending order and storing the resulting ordered indices of the sorted elements in the corresponding 2D scan order arrays.

16. The method of claim 15, wherein the absolute quantized transform coefficient matrices are updated by adding the absolute values of the elements in the second 2D arrays of quantized transform coefficients to the corresponding elements in the corresponding absolute quantized transfer coefficient matrices, and wherein the 2D scan order arrays are updated by sorting the elements of the updated absolute quantized transform coefficient matrices in descending order and storing the resulting ordered indices of the sorted elements in the corresponding 2D scan order arrays.

17. The method of claim 15 further comprising scanning the 2D arrays of quantized transform coefficients of the first frame according to a predetermined scanning pattern.

* * * * *

UNITED STATES PATENT AND TRADEMARK OFFICE
CERTIFICATE OF CORRECTION

PATENT NO. : 8,477,845 B2  Page 1 of 1
APPLICATION NO. : 12/905872
DATED : July 2, 2013
INVENTOR(S) : Lingzhi Liu et al.

It is certified that error appears in the above-identified patent and that said Letters Patent is hereby corrected as shown below:

In the Claims

Column 14, line 65 - Column 15, line 3, printed claim 2, should read as:
2. The apparatus of claim 1, further comprising an inter-prediction motion compensation unit, wherein the inter-prediction motion compensation unit is configured to generate a plurality of residual value matrices for a plurality of macroblocks in a frame based on a plurality of inter-prediction modes and/or a plurality of motion vectors.

Column 15, lines 4-6, printed claim 3, should read as:
3. The apparatus of claim 2, further comprising a transform unit couple to the inter-prediction motion compensation unit, wherein the transform unit is configured to generate a plurality of two dimensional (2D) arrays of transform coefficients that correspond to the residual value matrices.

Signed and Sealed this
Sixth Day of August, 2013

Teresa Stanek Rea
*Acting Director of the United States Patent and Trademark Office*